March 20, 1951 — L. W. HOSFORD — 2,545,812

COMBINED FLUID MIXING AND DISPENSING DEVICE

Filed Jan. 17, 1945

INVENTOR.
LEO W. HOSFORD
BY Henry Gifford Hardy
HIS ATTORNEY.

Patented Mar. 20, 1951

2,545,812

UNITED STATES PATENT OFFICE 2,545,812

COMBINED FLUID MIXING AND DISPENSING DEVICE

Leo W. Hosford, San Francisco, Calif.

Application January 17, 1945, Serial No. 573,223

8 Claims. (Cl. 222—129)

The present invention relates to improvements in unitary apparatus for mixing and dispensing several individual fluids and pertains more particularly to a unitary combination for the individual mixing or preparation of several different solutions of salts, reagents, compounds and the like, especially those used in drug stores and those fluids used in mortuaries for embalming.

It is an object of the present invention to provide in a unitary structure means for mixing and preparing several different fluids, for storing the same in limited quantities and readily dispensing said fluids, whereby said several fluids are most efficiently prepared and easily dispensed in fresh condition.

It is a further object of this invention to provide in a unitary mixing, storage and dispensing device for several different fluids, wherein the individual fluids are kept at a relatively constant temperature throughout their preparation, storage, and dispensing, thereby eliminating deteriorations of said fluids due to temperature changes.

These objects are accomplished by the general arrangement of a housing, such as a cabinet or frame, and contained therein a mixing tank or vat, motor-driven means for agitating the contents of said tank, pumping means, including suitable conduits, valves, filters, etc., for transferring the mixed fluid from the mixing tank to limited storage containers, and thermostatic temperature controlling means. Also provided are suitable graduated measuring devices and the like for measuring the ingredients to be compounded in the mixing tank together with necessary gauges and other indicating devices and controls for the operation of the apparatus of the present invention.

Since others than those skilled in chemistry and the compounding and mixing of fluids are intended to use the device of the present invention, it is an object thereof to provide a convenient, efficient unit wherein human error is eliminated to a great degree and one which can be handled by an average intelligent person.

Further objects and advantages of the present invention reside in the particular combination, arrangement and relationship of the various parts as will be readily apparent from the following description taken in reference to the drawings, wherein.

Figure 1:
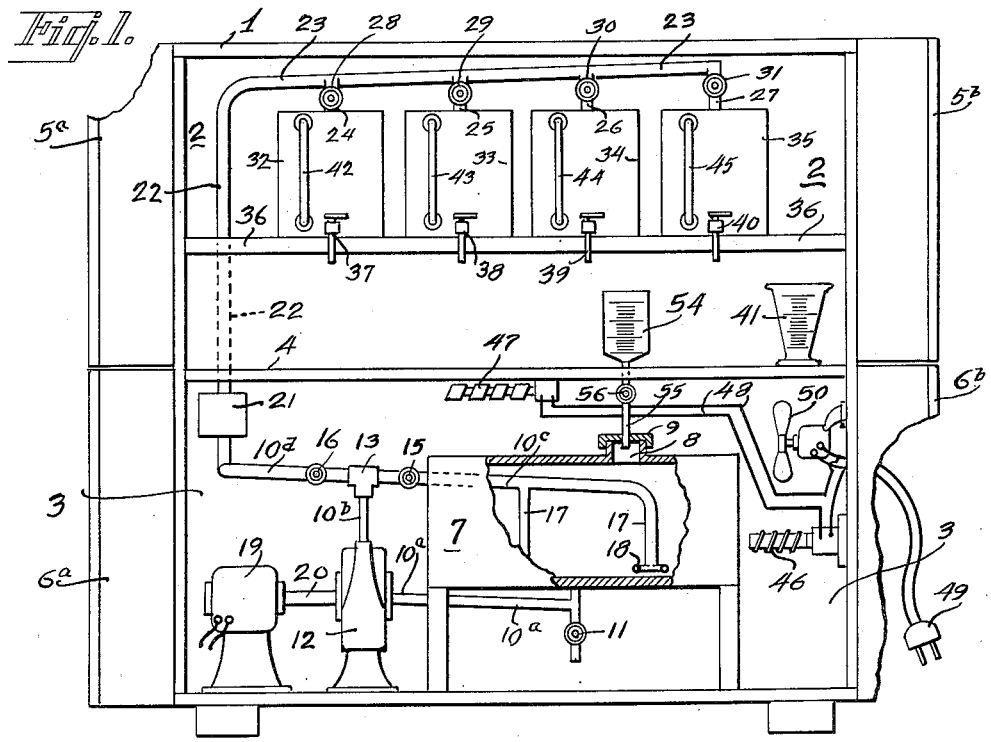
Figure 1 is a front elevational view of a preferred embodiment of the unitary mixing, storage and dispensing device of the present invention, parts in said view being cut away and shown in cross-section.
Figure 2:
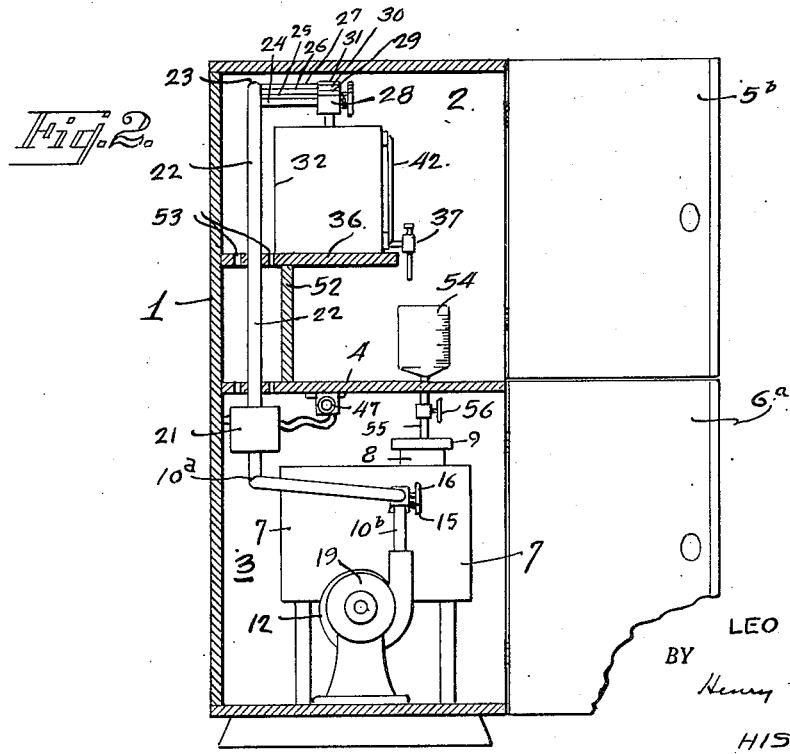
Figure 2 is an end elevational view taken from the left of Figure 1, part of the end wall being removed.

While my invention is directed more generally to unitary mixing and dispensing devices and should be construed broadly within the scope of the appended claims, it will be described for the sake of clarity and simplicity in relation to a unitary mixing and dispensing device for the manufacture or compounding of the several embalming fluids to be used in individual mortuaries.

Referring to the drawings in more detail, a housing or cabinet 1 is divided into upper and lower compartments 2 and 3 the horizontal member 4 forming the top of compartment 3 acts as a working table or surface for the operator. Each compartment 2 and 3 is provided with suitable movable closure means for access thereinto, such as slidable panels or hinged doors 5a and 5b and 6a and 6b, respectively, which along with the rest of the cabinet may be of wood, glass, metal, or any other suitable material. The movable doors may be located at the front or in the back as may be desired so as to provide complete, easy access to the interior of each compartment.

In lower compartment 3, the front covering doors 6a and 6b of which are open in Figure 1 to expose the interior thereof, is arranged a mixing tank or vat 7 having a filler spout 8 with a closure cap 9 through which the measured quantities of the ingredients necessary for compounding of the desired fluids are introduced. For example, in the preparation of the individual embalming fluids, such as coinjection fluid, soft, medium or hard arterial fluids, or cavity fluid, measured amounts of the required salts, and/or other materials, such as solvents, etc., are first placed and measured in the calibrated percolator 54 introduced into the mixing tank 7 through the line 55 passing through the cap 9 on filler spout 8 by opening valve 56. This valve remains closed at all times except when the measured ingredient is released to tank 7.

Although any suitable arrangement for agitating the contents of the mixing tank 7 may be used, I prefer to accomplish this agitation in the following manner. Fluid is withdrawn through draw-off conduit 10a from the bottom of tank 7, drain valve 11 being closed, and is recirculated by means of pump 12, pump discharge conduit 10b, T 13, return branch conduit 10c, open valve 15 in conduit 10c, down pipes 17, and out through horizontal nozzles 18 into the mixing tank 7, During the recirculation valve 16 in the other branch conduit 10d is closed. Pump 12 is driven by motor 19 through connecting shaft 20. When the fluid being prepared in mixing tank 7 has been completed valve 15 is closed and valve 16 opened. The prepared fluid passes through transfer conduit 10d through a suitable filter 21, and on through vertical conduit 22 to conduit 23, from whence it passes through one of the branch lines 24, 25, 26 and 27 depending upon which one of the valves 28, 29, 30 and 31 is opened, to the corresponding dispensing container 32, 33, 34 or 35 as the case may be. These storage containers are arranged in compartment 2 and are supported upon the member 36 thereof. Each storage container is provided with dispensing means such as spigots 37, 38, 39 and 40, respectively, through which the desired mixed and prepared fluid may be withdrawn as needed, for example, into graduated measure 41. The storage containers 32–35, inclusive, are preferably provided with volume indicators, such as visual gauging glass tubes 42, 43, 44 and 45, respectively which may preferably be read through the front panels of compartment 2 without exposing the containers and the rest of the equipment.

It will be noted that no conduit is horizontal but that those near the horizontal are inclined slightly so that residual liquid in the various conduits from uppermost valves 28–31, inclusive, will drain into the mixing tank 7, from which it can be withdrawn through valve 11. It is apparent that the entire apparatus may be kept free of residual liquids in the conduits. The conduits may be formed of glass, metal, rubber, plastic, etc.

In some cases, such as with embalming fluids or liquids, and the like, it is highly desirable that the several individual fluids be kept at a relatively constant temperature throughout their preparation, storage and dispensing in order that deteriorations, such as crystallization, precipitation, etc., due to atmospheric temperature variations will be eliminated or substantially diminished. For this purpose, it is desirable to maintain the temperature of the cabinet relatively constant, for example, at 85°–90° F. or higher or lower, as desired, by means of a thermostatic control system. Such a system established in compartment 3 may suitably comprise heating means such as an electric heating element 46 which is in series with a temperature-responsive control, such as a thermally expansible coil-operated switch 47 in an electrical circuit of electrical conductors 48 supplied by connection of plug 49 to an electrical current outlet. The temperature is maintained relatively constant throughout the both compartments 2 and 3 of the cabinet 1 by circulating the air therein by small electrical fan 50, the air passing through communicating ports, such as slots or holes 51 formed in the horizontal member 4 between the back of the cabinet and panel 52 and corresponding slots or holes 53 in the supporting member 36.

The above-described unitary structure including the combination of a mixing tank, mixing means, conduits, etc., together with the individual storage containers constitutes the preferred and most advantageous form of my invention and the particular value in the handling of liquids which deteriorate with much exposure of air, such as in pouring from one container to another. However, in some cases the individual storage containers for each of the several fluids may be separate from the thermostatically controlled constant temperature cabinet containing the mixing tank, means for agitating the contents thereof, pumping means, conduits, valves, etc., while still retaining some of the advantages of the present invention. When said storage containers are separated from said mixing tank, etc., it is usually most desirable to arrange said containers at a higher level than said mixing tank, as in the above-described preferred unitary structure, so that residual fluid in the transferring lines can be readily drained back into the mixing tank.

I claim:

1. In a unitary mixing, storage and dispensing device for several different fluids, the combination of a housing having movable closure means for access thereinto, and containing a mixing tank, means for introducing the desired ingredients into said tank, means for agitating the contents of said tank, means including a pump, a motor for driving said pump, conduits, and valves for transferring said mixed fluid from said tank, and for receiving said mixed fluid a plurality of individual storage containers having dispensing means.

2. In a unitary mixing, storage and dispensing device for several different fluids, the combination of a cabinet divided into upper and lower compartments, movable closure means for access into said compartments, and in said lower compartment a mixing tank, means for introducing the desired ingredients into said tank, means for agitating the contents of said tank, means including a pump, a motor for driving said pump, conduits and valves for transferring said mixed fluid from said tank, and in said upper compartment a plurality of individual storage containers for receiving said mixed fluid, conduit means in connection with said lower compartment conduits for transferring said fluid to said containers, valves in said conduit, means for selectively directing the fluid into the desired container and dispensing means carried by said containers.

3. In a unitary mixing, storage and dispensing device for several different fluids, the combination of a cabinet divided into upper and lower compartments, movable closure means for access into said compartments, and in said lower compartment a mixing tank, means for introducing the desired ingredients into said tank, means for agitating the contents of said tank, means including a pump, a motor for driving said pump, conduits and valves for transferring said mixed fluid from said tank, and in said upper compartment a plurality of individual storage containers for receiving said mixed fluid, conduit means in connection with said lower compartment conduits for transferring said fluid to said containers, valves in said conduit, means for selectively directing the fluid into the desired container, dispensing means carried by said containers, and thermostatically controlled means for maintaining constant temperatures in said upper and lower compartments.

4. A unitary mixing, storage and dispensing device for several different fluids, comprising in combination, a cabinet having upper and lower compartments, enclosed means communicating between said compartments, movable closure means for access into said compartments, and in said lower compartment a mixing tank, means for introducing the desired ingredients from storage containers in said upper compartment into said tank, means for agitating the contents of said tank, means including a pump, a motor for driving said pump, conduits, and valves for transferring said mixed fluid from said tank, a thermostatic control system for maintaining the temperature within said cabinet at a relatively constant temperature, said control system comprising heating means, temperature-responsive means for controlling the operation of said heating means, and fan means for causing circulation of the air within the cabinet into contact with said heating means and temperature-responsive control means and through said enclosed communicating parts between said upper and lower compartments, and in the upper compartment a plurality of individual storage containers for ingredients and receiving said mixed fluid from said mixing tank, conduit means in connection with said lower compartment conduits for transferring said fluid to said containers, valves in said conduit means for selectively directing the fluid from and into the desired container, and dispensing means carried by each of said containers.

5. A device for compounding and mixing embalming fluids and the like, comprising in combination, a housing having movable closure means for access thereinto and containing a mixing tank, means associated with the inlet of said tank for introducing the desired ingredients thereinto, a draw-off conduit opening into the bottom of said tank and a pump cooperating therewith for withdrawing the contents of said tank, a motor for driving said pump, a discharge conduit connected to the discharge of said pump, a T connected to the other end of said discharge conduit, a return conduit connected to one arm of said T and passing into said mixing tank for recirculation of fluid thereto, a control valve in said return conduit, a transfer conduit connected to the other arm of said T for transferring the mixed fluid from said mixing tank, a filter in said transfer conduit, a control valve in said transfer conduit relatively close to said T, and a thermostatic control system for maintaining the temperature in said housing selectively constant and comprising an electrical circuit including an electrical heating element and a temperature-responsive electrical switch in series with each other and fan means for causing circulation of the air within the cabinet into contact with said heating element and temperature-responsive switch.

6. In a unitary mixing, storage and dispensing device for several different liquids as used for embalming and the like the combination of a cabinet having upper and lower compartments, and in said lower compartment a mixing tank, removable means for directly feeding measured ingredients into said tank, a draw-off conduit opening into the bottom of said tank and a pump cooperating with said conduit for withdrawing the contents of said tank, a motor for driving said pump, a discharge conduit connected to the discharge of said pump, a T connected to the other end of said discharge conduit, a return conduit connected to one arm of said T and passing into said mixing tank, a valve in said return conduit, a transfer conduit connected to the other arm of said T for transferring the mixed liquid from said mixing tank, a filter in said transfer conduit, a thermostatic temperature control system comprising heating means, a temperature-responsive means for controlling the operation of said heating means, and fan means for causing circulation of the air within the cabinet over said heating means and temperature-responsive control means, and in said upper compartment, a plurality of individual storage containers for receiving said mixed liquid from said mixing tank, conduit means in connection with said transfer conduit in said lower compartment for conducting said liquid to said containers, valves in said conduit means for selectively directing the liquid into the desired container, dispensing spigots in said containers, and visual gauge tubes for indicating the volume of the contents of said containers, all of said conduits being arranged in other than horizontal position in such manner so that residual liquid therein will drain into said mixing tank.

7. Apparatus of the character described for aseptically dispensing fluid biological preparations, which comprises a main storage vessel, outlet means for withdrawing fluid from said vessel, valve-controlled means for recycling any desired proportion of the fluid withdrawn through said outlet means and for routing any desired proportion thereof to individual dispensing vessels, a plurality of individual dispensing vessels, and a valve-controlled manifold connected with said valve-controlled means for delivering fluid to any one or more of said dispensing vessels.

8. Apparatus of the character described for aseptically dispensing fluid biological preparations, which comprises a main storage vessel, outlet means for withdrawing fluid from said vessel, valve-controlled pump means for recycling any desired proportion of the fluid withdrawn through said outlet means and for routing any desired proportion thereof to individual dispensing vessels, a plurality of individual dispensing vessels, and a valve-controlled manifold connected with said valve controlled means for delivering fluid to any one or more of said dispensing vessels, the conduits of said apparatus being arranged so that residual fluid therein will drain into said main storage vessel during periods of idleness.

LEO W. HOSFORD.

REFERENCES CITED

The following references are of record in the file of this patent:

UNITED STATES PATENTS

| Number | Name | Date |
| --- | --- | --- |
| 494,061 | Day | Mar. 21, 1893 |
| 1,180,344 | Valentine | Apr. 25, 1916 |
| 1,332,945 | Holderle et al. | Mar. 9, 1920 |
| 1,804,519 | Smith et al. | May 12, 1931 |
| 1,859,566 | Konikow | May 24, 1932 |
| 2,125,248 | Taylor | July 26, 1938 |
| 2,167,438 | Kaufman | July 25, 1939 |
| 2,391,003 | Bowman | Dec. 18, 1945 |